(12) United States Patent
Ulrich et al.

(10) Patent No.: US 11,641,167 B1
(45) Date of Patent: May 2, 2023

(54) TRANSFORMERLESS PARALLEL AFE WITH GROUND CURRENT REGULATOR

(71) Applicant: Rockwell Automation Technologies, Inc., Mayfield Heights, OH (US)

(72) Inventors: James A. Ulrich, Hartland, WI (US); Lixiang Wei, Mequon, WI (US); Ahmed Mohamed Sayed Ahmed, Mequon, WI (US); Nickolay N. Guskov, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/575,949

(22) Filed: Jan. 14, 2022

(51) Int. Cl.
*H02M 7/217* (2006.01)
*H02M 7/219* (2006.01)
*H02M 7/12* (2006.01)

(52) U.S. Cl.
CPC ......... *H02M 7/2173* (2013.01); *H02M 7/219* (2013.01); *H02M 7/125* (2013.01)

(58) Field of Classification Search
CPC ..... H02M 7/2173; H02M 7/219; H02M 7/125
See application file for complete search history.

(56) References Cited

U.S. PATENT DOCUMENTS

| | | | |
|---|---|---|---|
| 6,617,814 B1 | 9/2003 | Wu et al. | |
| 7,768,373 B2 | 8/2010 | Shudarek | |
| 9,054,586 B2 | 6/2015 | Wei et al. | |
| 9,613,745 B2 | 4/2017 | Shudarek | |
| 10,811,990 B1* | 10/2020 | Mohamed Sayed Ahmed | H02M 7/23 |
| 2004/0032755 A1* | 2/2004 | Pollanen | H02M 7/5387 363/71 |
| 2017/0353049 A1* | 12/2017 | Delanoe | H01F 27/306 |
| 2019/0047433 A1* | 2/2019 | Rozman | B60W 20/00 |

OTHER PUBLICATIONS

MTE RL Reactors Product Selector, MTE Corporation, 2016.
Zhilhong Ye, et zl. "Control of Circulating Current in Two Parallel Three-Phase Boost Rectifiers", IEEE Transactions on Power Electrtonics, vol. 17, No. 5, Sep. 2002.
TLink Option Module User Manual, Allen-Bradley by Rockwell Automation, Rockwell Automation Publication 750COM-UM100A-EN-P, Jun. 2021.
SINAMICS—Low Voltage Engineering Manual, version 6.7, Siemens AG, Jun. 2020.
User's Manual, ACA 635 IGBT Supply Sections 260 to 4728 kVA ACS 800-17 Line-side Converter 120 to 1385 kVA, ABB Oy., 2003.

* cited by examiner

*Primary Examiner* — Jue Zhang
(74) *Attorney, Agent, or Firm* — Lippes Mathias LLP (57) ABSTRACT

A transformerless parallel active rectifier system includes N multiphase common mode inductors directly connected to a shared multiphase AC input with no intervening transformer, and N active rectifiers coupled to respective ones of the N multiphase common mode inductors and having respective DC outputs coupled to a shared DC bus, where N is an integer greater than 1. The N active rectifiers have ground current regulators and are synchronized to provide DPWM switching control signals synchronized to one another to regulate their respective ground currents and concurrently regulate the shared DC bus voltage.

20 Claims, 4 Drawing Sheets

TRANSFORMERLESS PARALLEL AFE WITH GROUND CURRENT REGULATOR

BACKGROUND INFORMATION

Active rectifiers, such as active front end (AFE) converters can rectify AC input power to generate DC output power, as well as regenerate power to a grid, control and regulate an output DC bus voltage with a boost factor, and provide unity power factor with minimum current distortion, such as less than 5% according to IEEE-519 standards. The active frond end converter can be used in motor drive applications where the DC output is connected to multiple inverters or to one inverter controlling motor speed and/or torque. The active front end converter can be also used in grid tie applications where the DC side is connected to DC bus supply such as one or more batteries, fuel cells, or solar cells, etc. Certain applications require parallel operation of two or more power converters. In one example, the DC outputs of two or more AFE power converters are connected together at a common DC bus. One application is a "hot standby" or a "high redundancy" system where parallel power converters support a critical load with the ability to continue operation when one converter fails or is taken offline for maintenance. In this example, the AFE converters are controlled autonomously and there is no direct communication between the AFE units. In other applications, parallel AFE converters operate concurrently using additional control means to coordinate the operation of the parallel units for balanced load sharing. One example is referred to as droop control, which can also be used in other applications such as paralleling electrical generators feeding the same grid.

BRIEF DESCRIPTION

In one aspect, a system includes first and second common mode inductors directly connected to a multiphase AC input with no intervening transformer, as well as first and second active rectifiers. The first active rectifier has a first rectifier AC input coupled to the first multiphase common mode inductor, a first rectifier DC output having first and second DC nodes, a first switch circuit, and a first controller. The second active rectifier has a second rectifier AC input coupled to the second multiphase common mode inductor, a second rectifier DC output coupled to the first rectifier DC output, a second switch circuit, and a second controller. The first and second controllers generate respective first and second DPWM switching control signals synchronized to one another to operate the respective switch circuits to regulate respective first and second ground currents and to regulate a DC bus voltage across the first and second DC nodes.

In another aspect, an apparatus includes a multiphase common mode inductor configured to be directly connected to a multiphase AC input, and an active rectifier. The active rectifier has a rectifier AC input, a rectifier DC output, a switch circuit, and a controller. The rectifier AC input is coupled to the multiphase common mode inductor, the rectifier DC output has first and second DC nodes, and the switch circuit is configured to selectively couple nodes of the rectifier AC input to the first and second DC nodes according to discontinuous pulse width modulation (DPWM) switching control signals. The controller is configured to generate the DPWM switching control signals to regulate a ground current of the active rectifier and to regulate a DC bus voltage across the first and second DC nodes.

In a further aspect, a method includes sampling AC input phase currents of a rectifier AC input, computing a ground current of an active rectifier based on the AC input phase currents, computing a ground current regulator output based on the ground current to regulate the ground current, computing a DC bus regulator modulation index to regulate a DC bus voltage, computing an adjusted modulation index based on the DC bus regulator modulation index and the ground current regulator output to concurrently regulate the ground current and the DC bus voltage, and generating discontinuous pulse width modulation (DPWM) switching control signals to operate a switch circuit of the active rectifier based on the adjusted modulation index.

DETAILED DESCRIPTION

Referring now to the figures, several embodiments or implementations are hereinafter described in conjunction with the drawings, wherein like reference numerals are used to refer to like elements throughout, and wherein the various features are not necessarily drawn to scale.

Figure 1:
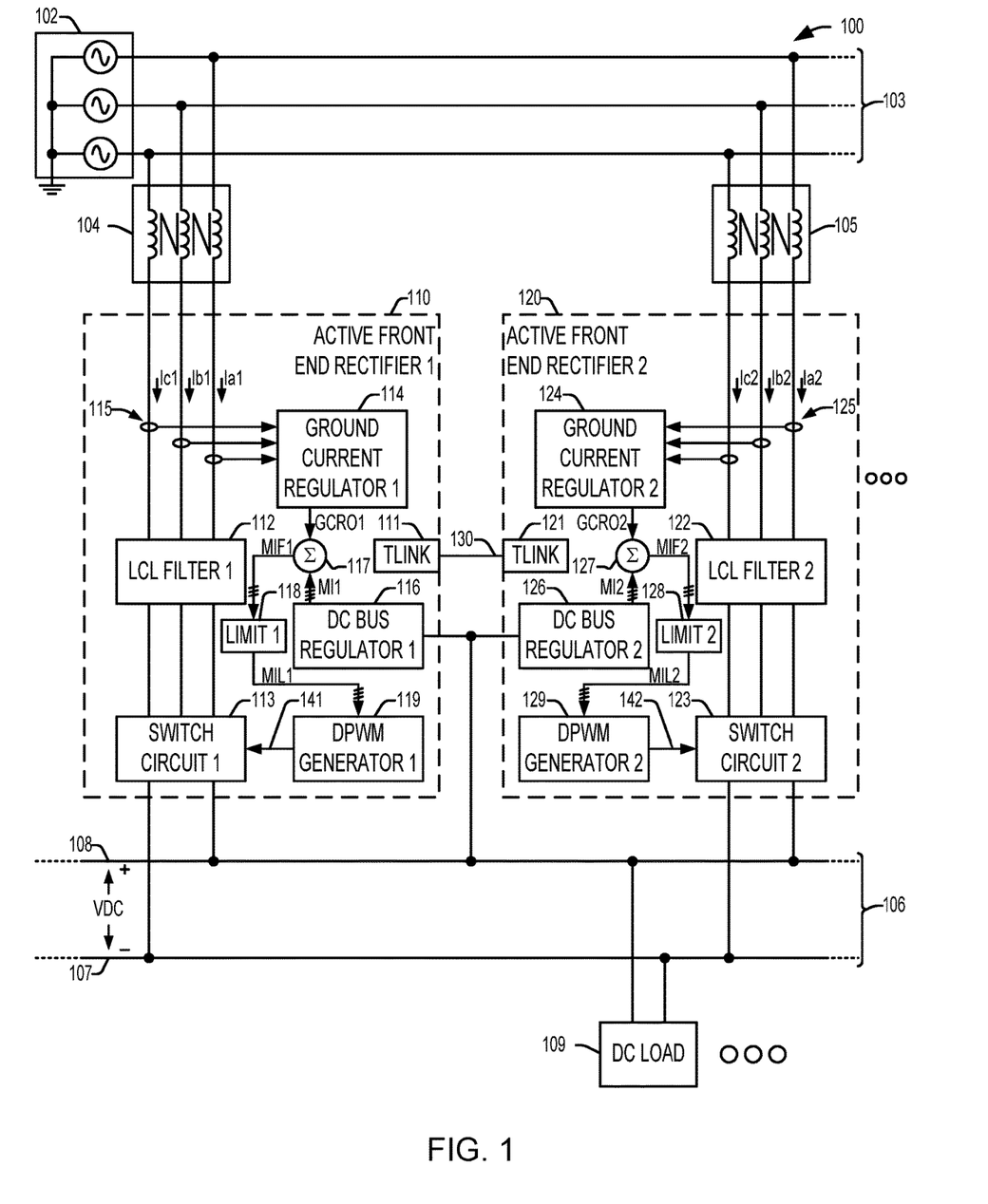
FIG. 1 is a schematic diagram of a transformerless parallel active rectifier system.
Figure 1A:
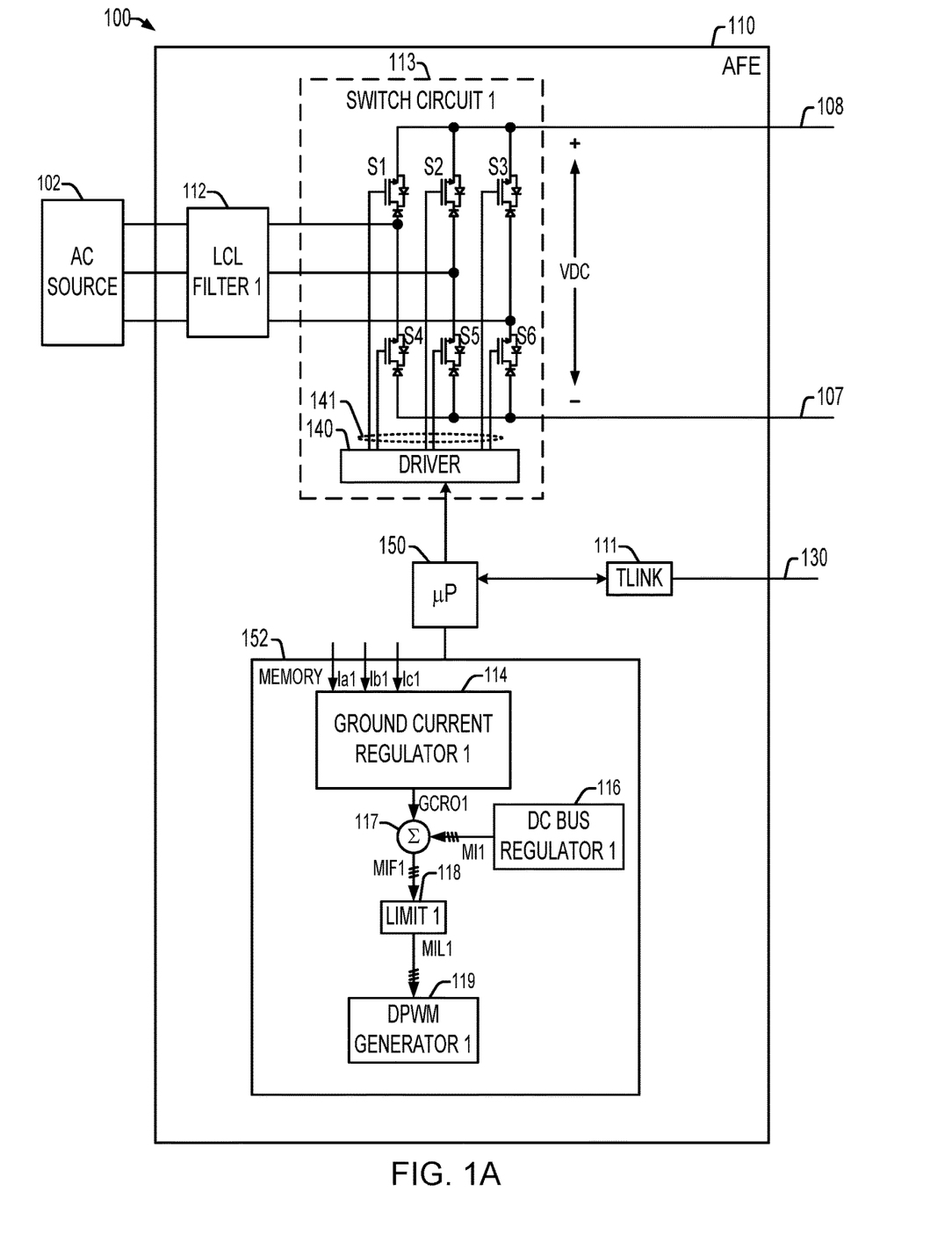
FIG. 1A is a partial schematic diagram showing further details of the system of FIG. 1.

FIGS. 1 and 1A show a power conversion system 100 having a multiphase power source 102 (e.g., a utility, generator or grid) that provides AC input power on a multiphase AC input 103. The system 100 has a first multiphase common mode inductor 104 directly connected to a multiphase AC input, and a second multiphase common mode inductor 105 directly connected to the multiphase AC input. The illustrated example is a three-phase system with three AC phases A, B, and C, and the respective common mode inductors 104 and 105 (e.g., common mode reactors) have three windings would around a shared core to provide a common mode flux path. In one example, the respective common mode inductors 104 and 105 are MTE RXL-0600-001 reactors from MTE Corporation of Menomonee Falls, Wis. Further common mode inductors are described in U.S. Pat. No. 7,768,373, granted Aug. 3, 2010 to Shudarek and U.S. Pat. No. 9,613,745, granted Apr. 4, 2017 to Shudarek, which are incorporated by reference herein.

The system 100 includes parallel active rectifiers coupled to a shared or common DC bus 106 having a first DC node 107 (e.g., labeled "−" in FIG. 1) and a second DC node 108 (e.g., labeled "+" in FIG. 1) to provide and control a DC bus voltage VDC across the first and second DC nodes 107 and 108. One or more DC loads 109 can be connected to the DC bus 106, such as inverters to drive an AC motor, as well as one or more batteries, fuel cells, or solar cells, etc. that can selectively consume DC power from the bus 106 or supply power to the bus 106 for regeneration by the active rectifier(s) to supply AC power to the multiphase power source 102.

A first active rectifier 110 has a first rectifier AC input coupled to the first multiphase common mode inductor 104. The first active rectifier 110 has a first rectifier DC output that forms or is coupled to the first and second DC nodes 107 and 108. The first active rectifier 110 includes a communications interface or link circuit 111 to provide a communications connection first active rectifier 110 and one or more further active rectifiers for synchronizing pulse width modulation (PWM) switching control signals thereof.

The first active rectifier 110 in one example includes a first multiphase LCL filter 112 and a first switch circuit 113. The first multiphase LCL filter 112 is coupled between the first multiphase common mode inductor 104 and the first switch circuit 113. The first multiphase LCL filter 112 is a three-phase filter with individual LCL phase circuits having a first inductor and a second inductor coupled in series between an associated phase line of the first multiphase common mode inductor 104 and an associated phase line of the first switch circuit 113, as well as a capacitor coupled between the node that joins the two inductors and a common connection, where the three filter capacitors are connected to one another at the common connection. In one example, the common connection of the first multiphase LCL filter 112 is grounded, for example, to a ground reference of the multiphase power source 102. In another example, the common connection of the first multiphase LCL filter 112 is connected to another reference node of the system 100. In another example, the common connection of the first multiphase LCL filter 112 is floating. In another implementation, the multiphase LCL filter 112 is replaced with a different input filter, such as a multiphase LC filter circuit (not shown). In another implementation, the multiphase LCL filter 112 is omitted.

The first active rectifier 110 includes a first switch circuit 113 with AC nodes coupled to the first multiphase common mode inductor 104 through the first multiphase LCL filter 112 (or coupled directly to the first multiphase common mode inductor 104 if the filter 112 is omitted). The first switch circuit 113 also provides the first rectifier DC output that forms or is coupled to the first and second DC nodes 107 and 108. FIG. 1A shows one example, in which the first switch circuit 113 includes switching devices S1-S6 individually connected between a corresponding one of the respective AC nodes and a corresponding DC node 107 or 108 of the shared DC bus. The individual switching devices S1-S6 are configured to selectively couple a respective one of the AC nodes with a respective one of the first and second DC nodes 107 and 108 according to a respective switching control signal.

The first active rectifier 110 includes a first controller that includes a first ground current regulator 114 configured to regulate a first ground current I01 (e.g., zero sequence current I0) of the first active rectifier 110. In one example, the first ground current regulator 114 regulates the first ground current I01 to zero to mitigate (e.g., minimize) the ground current in the first active rectifier 110 in a closed loop fashion. The first active rectifier 110 includes current sensors 115 configured to sense respective AC input phase currents Ia1, Ib1, and Ic1 of the first rectifier AC input. The first ground current regulator 114 provides a first ground current regulator output GCRO1 as a signal or value used by the first controller to regulate the ground current I0.

The first controller of the first active rectifier 110 includes a first DC bus regulator 116 configured to regulate the DC bus voltage VDC. The first DC bus regulator 116 has an input to receive a DC bus voltage feedback signal and an output that provides a first bus regulator modulation index MI1 as a signal or value to regulate the DC bus voltage VDC based on the DC bus voltage feedback signal and a setpoint signal or value. The first controller includes a first summer 117 with inputs that receive the first ground current regulator output GCRO1 and the first bus regulator modulation index MI1 The first summer 117 has an output that provides a first adjusted or final modulation index MIF1 based on the DC bus regulator modulation index MI1 and the ground current regulator output GCRO1 to concurrently regulate the ground current I01 and the DC bus voltage VDC. In one implementation, the first summer 117 provides the first adjusted or final modulation index MIF1 as the sum of the DC bus regulator modulation index MI1 and the ground current regulator output GCRO1 (e.g., MIF1=MI1+GCRO1).

The first controller of the first active rectifier 110 in one example includes a limiter 118 that limits the modulation index to be less than a limit value, such as 1.15. In another implementation, the limiter 118 is omitted. In the illustrated example, the limiter 118 limits the first adjusted modulation index MIF1 to less than 1.15 and provides a first limited modulation index MIL1 as a signal or value. Other limit values can be used in other examples. In another implementation, the limiter 118 is omitted.

The first controller of the first active rectifier 110 also includes a first discontinuous pulse width modulation (DPWM) signal generator 119 that generates first DPWM switching control signals 141 for operating the first switch circuit 113 based on the first ground current regulator output GCRO1 of the first ground current regulator 114 and the first bus regulator modulation index MI1 of the first DC bus regulator 116 to regulate the first ground current I01 of the first active rectifier 110 and to regulate the DC bus voltage VDC. In the illustrated example, the first DPWM signal generator 119 generates the first DPWM switching control signals 141 based on the first limited modulation index MIL1 (or on the first adjusted modulation index MIF1 if the limiter 118 is omitted. In one example, the first DPWM signal generator 119 generates the first DPWM switching control signals 141 at a switching frequency of 10 kHz or less, such as 1-5 kHz, for example, 3-4 kHz.

The first switch circuit 113 is configured to selectively couple nodes of the first rectifier AC input (directly or through any included LC OR LCL filter 112) to the first and second DC nodes 107 and 108 according to the first DPWM switching control signals 141. The switching circuit 113 in FIG. 1A includes a driver circuit 140 that provides the switching control signals 141 to the respective switching devices S1-S6 under control of a processor 150 of the first controller. When powered and operating, the first controller operates the switches S1-S6 of the first switch circuit 113 to convert AC power to provide and regulate the DC bus voltage VDC in a first operating mode, or to regenerate power from the DC bus 106 to deliver three-phase AC power to the multiphase AC input 103 in a second (e.g., regenerating) operating mode. Moreover, the first controller concurrently regulates the first ground current I01 of the first active rectifier 110 to zero to mitigate (e.g., minimize) the ground current in the first active rectifier 110 in a closed loop fashion while regulating the DC bus voltage VDC.

The system 100 also includes a second active rectifier 120. The first communications interface circuit 111 provides a high-speed communications link 130 between the first active rectifier 110 and the second active rectifier 120 to synchronize the first DPWM switching control signals 141 of the first active rectifier 110 to second DPWM switching control signals 142 of the second active rectifier 120. In one example, the first communications interface circuit 111 is coupled to a communications interface circuit 121 of the second active rectifier 120, for example, by a fiber optic connection, to synchronize the switching control signals 141 and 142 of the respective active rectifiers 110 and 120 to one another, for example, within a time tolerance of 3 us. In one implementation, the communications interface circuits 111 and 121 are or include two TLink option modules installed in two or more drives or dedicated active rectifiers 110 and 120 that are connected by a fiber-optic cable to provide the communications link 130. In one example, the first active rectifier 110 is considered the leader and the second active rectifier 120 is considered a follower. The TLink option modules 111 and 121 provide synchronization of the active rectifiers 110 and 120 to share data from the leader to one or more followers.

As shown in FIG. 1, the system 100 includes the second multiphase common mode inductor 105 and the second active rectifier 120 coupled in parallel with the first multiphase common mode inductor 104 and the first active rectifier 110 between the multiphase AC input 103 and the DC bus 106. In another example, the system 100 includes more than two parallel active rectifiers and associated multiphase common mode inductors. In one example, the second active rectifier 120 is constructed similarly to the first active rectifier 110 as shown in FIG. 1A. The second active rectifier 120 in FIG. 1 has a second rectifier AC input coupled to the second multiphase common mode inductor 105. The second active rectifier 120 has a second rectifier DC output that forms or is coupled to the first and second DC nodes 107 and 108. The second active rectifier 120 includes a communications interface or link circuit 121 to provide a communications connection second active rectifier 120 and one or more further active rectifiers for synchronizing pulse width modulation (PWM) switching control signals thereof.

The second active rectifier 120 in one example includes a second multiphase LCL filter 122 and a second switch circuit 123. The second multiphase LCL filter 122 is coupled between the second multiphase common mode inductor 105 and the second switch circuit 123. The second multiphase LCL filter 122 is a three-phase filter with individual LCL phase circuits having a first inductor and a second inductor coupled in series between an associated phase line of the second multiphase common mode inductor 105 and an associated phase line of the second switch circuit 123, as well as a capacitor coupled between the node that joins the two inductors and a common connection, where the three filter capacitors are connected to one another at the common connection. In one example, the common connection of the second multiphase LCL filter 122 is grounded, for example, to the ground reference of the multiphase power source 102. In another example, the common connection of the second multiphase LCL filter 122 is connected to another reference node of the system 100. In another example, the common connection of the second multiphase LCL filter 122 is floating. In another implementation, the multiphase LCL filter 122 is replaced with a different input filter, such as a multiphase LC filter circuit (not shown). In another implementation, the multiphase LCL filter 122 is omitted.

The second active rectifier 120 includes a second switch circuit 123 with AC nodes coupled to the second multiphase common mode inductor 105 through the second multiphase LCL filter 122 (or coupled directly to the second multiphase common mode inductor 105 if the filter 122 is omitted). The second switch circuit 123 also provides the second rectifier DC output that forms or is coupled to the first and second DC nodes 107 and 108. The second switch circuit 123 in one implementation includes switching devices (e.g., similar to switches S1-S6 of the first switching circuit 113 in FIG. 1A) individually connected between a corresponding one of the respective AC nodes and a corresponding DC node 107 or 108 of the shared DC bus to selectively couple a respective one of the AC nodes with a respective one of the first and second DC nodes 107 and 108 according to a respective second DPWM switching control signal 142.

The second active rectifier 120 includes a second controller that includes a second ground current regulator 124 configured to regulate a second ground current I02 (e.g., zero sequence current I02) of the second active rectifier 120. In one example, the second ground current regulator 124 regulates the second ground current I02 to zero to mitigate (e.g., minimize) the ground current in the second active rectifier 120 in a closed loop fashion. The second active rectifier 120 includes current sensors 125 configured to sense respective AC input phase currents Ia2, Ib2, and Ic2 of the second rectifier AC input. The second ground current regulator 124 provides a second ground current regulator output GCRO2 as a signal or value used by the second controller to regulate the second ground current I02. The second controller of the second active rectifier 120 includes a second DC bus regulator 126 configured to regulate the DC bus voltage VDC. The second DC bus regulator 126 has an input to receive the DC bus voltage feedback signal and an output that provides a second bus regulator modulation index MI2 as a signal or value to regulate the DC bus voltage VDC based on the DC bus voltage feedback signal and based on a setpoint signal or value. The second controller includes a second summer 127 with inputs that receive the second ground current regulator output GCRO2 and the second bus regulator modulation index MI2. The second summer 127 has an output that provides a second adjusted or final modulation index MIF2 based on the DC bus regulator modulation index MI2 and the ground current regulator output GCRO2 to concurrently regulate the second ground current I02 and the DC bus voltage VDC. In one implementation, the second summer 127 provides the second adjusted or final modulation index MIF2 as the sum of the DC bus regulator modulation index MI2 and the ground current regulator output GCRO2 (e.g., MIF2=MI2+GCRO2).

The second controller of the second active rectifier 120 in one example includes a limiter 128 that limits the modulation index to be less than a limit value, such as 1.15. In another implementation, the limiter 128 is omitted. In the illustrated example, the limiter 128 limits the second adjusted modulation index MIF2 to less than 1.15 and provides a second limited modulation index MIL2 as a signal or value. Other limit values can be used in other examples. In another implementation, the limiter 128 is omitted.

The second controller of the second active rectifier 120 also includes a second discontinuous pulse width modulation (DPWM) signal generator 129 that generates second DPWM switching control signals 142 for operating the second switch circuit 123 based on the second ground current regulator output GCRO2 of the second ground current regulator 124 and the second bus regulator modulation index MI2 of the second DC bus regulator 126 to regulate the second ground current I02 of the second active rectifier 120 and to regulate the DC bus voltage VDC. In the illustrated example, the second DPWM signal generator 129 generates the second DPWM switching control signals 142 based on the second limited modulation index MIL2 (or on the second adjusted modulation index MIF2 if the limiter 128 is omitted. In one example, the second DPWM signal generator 129 generates the second DPWM switching control signals 142 at a switching frequency of 10 kHz or less, such as 1-5 kHz, for example, 3-4 kHz.

The second switch circuit 123 is configured to selectively couple nodes of the second rectifier AC input (directly or through any included LC OR LCL filter 122) to the first and second DC nodes 107 and 108 according to the second DPWM switching control signals 142. The switching circuit 123 in one example includes a driver circuit (e.g., similar to the driver circuit 140 in FIG. 1A) that provides the switching control signals 142 to the respective switching devices of the second switch circuit 123 under control of a processor of the second controller (e.g., similar to processor 150 in FIG. 1A). When powered and operating, the second controller operates the switches S1-S6 of the second switch circuit 123 to convert AC power to provide and regulate the DC bus voltage VDC in a first operating mode, or to regenerate power from the DC bus 106 to deliver three-phase AC power to the multiphase AC input 103 in a second (e.g., regenerating) operating mode. Moreover, the second controller concurrently regulates the second ground current I02 of the second active rectifier 120 to zero to mitigate (e.g., minimize) the ground current in the second active rectifier 120 in a closed loop fashion while regulating the DC bus voltage VDC.

In one implementation, the first and second controllers are implemented by a corresponding processor of the respective active rectifiers 110 and 120. FIG. 1A shows one example of the first controller implemented as processor executable program instructions stored in an electronic memory 152 for execution by the processor 150. In this example, the processor 150 executes program instructions to implement the ground current regulator 114, the DC bus regulator 116, the summer 117, the limiter 118 and the DPWM signal generator 119. The communications connection 111, 121, 130 between the first and second controllers provides synchronization, and the first and second controllers generate the respective first and second DPWM switching control signals 141 and 142 synchronized to one another.

The system 100 in FIGS. 1 and 1A advantageously facilitates parallel active rectifier operation without an isolation transformer, while regulating ground currents in the individual rectifiers 110 and 120. Isolation transformers add significant extra cost and size to parallel rectifier systems and may require extra protection components in the system. For existing facilities, adding an extra transformer may not be feasible or possible, and the disclosed example provide a cost effective and compact solution with controlled circulating ground currents and DC bus voltage regulation.

Figure 2:
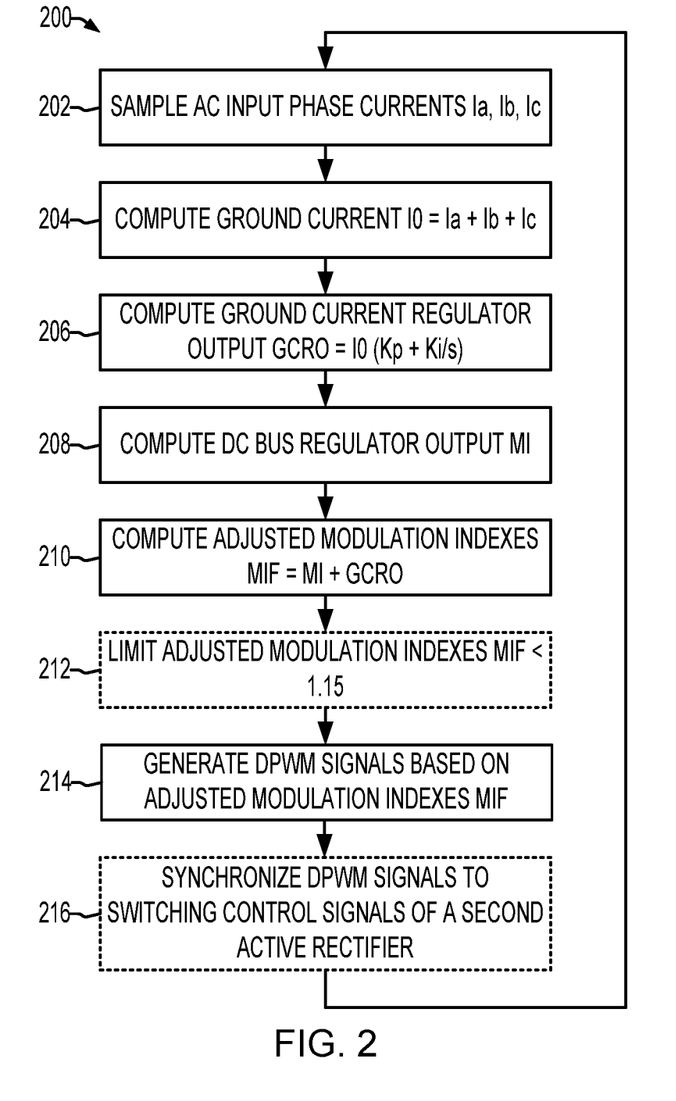
FIG. 2 is a flow diagram of a method.

FIG. 2 shows a method 200 that can be implemented concurrently in the individual active rectifiers 110 and 120 of the above system 100. The method 200 includes sampling AC input phase currents at 202 (e.g., currents Ia, Ib, Ic of a rectifier AC input). At 204, the ground current (I0) of the active rectifier is computed based on the AC input phase currents. In one example, the rectifier ground current I0 is computed at 204 as the sum of the sampled AC input phase currents (e.g., I0=Ia+Ib+Ic). At 206, a ground current regulator output GCRO is computed based on the computed ground current I0 to regulate the ground current I0. In one example, the first and second ground current regulators 114 and 124 are or include proportional-integral (PI) controllers or regulators that compute the respective ground current regulator outputs GCRO1 and GCRO2 based on the respective computed ground currents I01 and I02 and proportional and integral scaling factors or constants Kp and Ki, respectively (e.g., GCRO=(Kp+Ki/s)*I0), where the PI factors Kp and Ki can be the same or different for the respective first and second ground current regulators 114 and 124.

The method 200 continues at 208 with computing the DC bus regulator output modulation index MI1 to regulate the DC bus voltage VDC. In one example, the DC bus voltage regulators 116 and 126 are or include PI controllers programmed with corresponding factors Kp and Ki and the DC bus voltage regulators 116 and 126 compute the respective bus regulator output modulation indexes MI1 and MI2 based on the DC bus voltage feedback signal and a setpoint signal or value at 208. At 210, the controllers compute the adjusted modulation index MIF based on the DC bus regulator modulation index MI and the ground current regulator output GCRO1 for the respective active rectifiers 110 and 120 to concurrently regulate the ground current I0 and the DC bus voltage VDC (e.g., MIF=MI+CGRO). At 212, the method 200 includes limiting the adjusted modulation index MIF to less than 1.15. In another implementation, the limiting at 212 is omitted. At 214, the DPWM switching control signals 141 and 142 are generated by the DPWM signal generators 119 and 129 to operate the respective switch circuits 113 and 123 of the active rectifiers 110 and 120 based on the adjusted modulation indexes MIF1 and MIF2. At 216 in one example, the DPWM switching control signals 141 and 142 are synchronized, for example to within 3 us. The method 200 then repeats for further rectifier switching control cycles.

Figure 3:
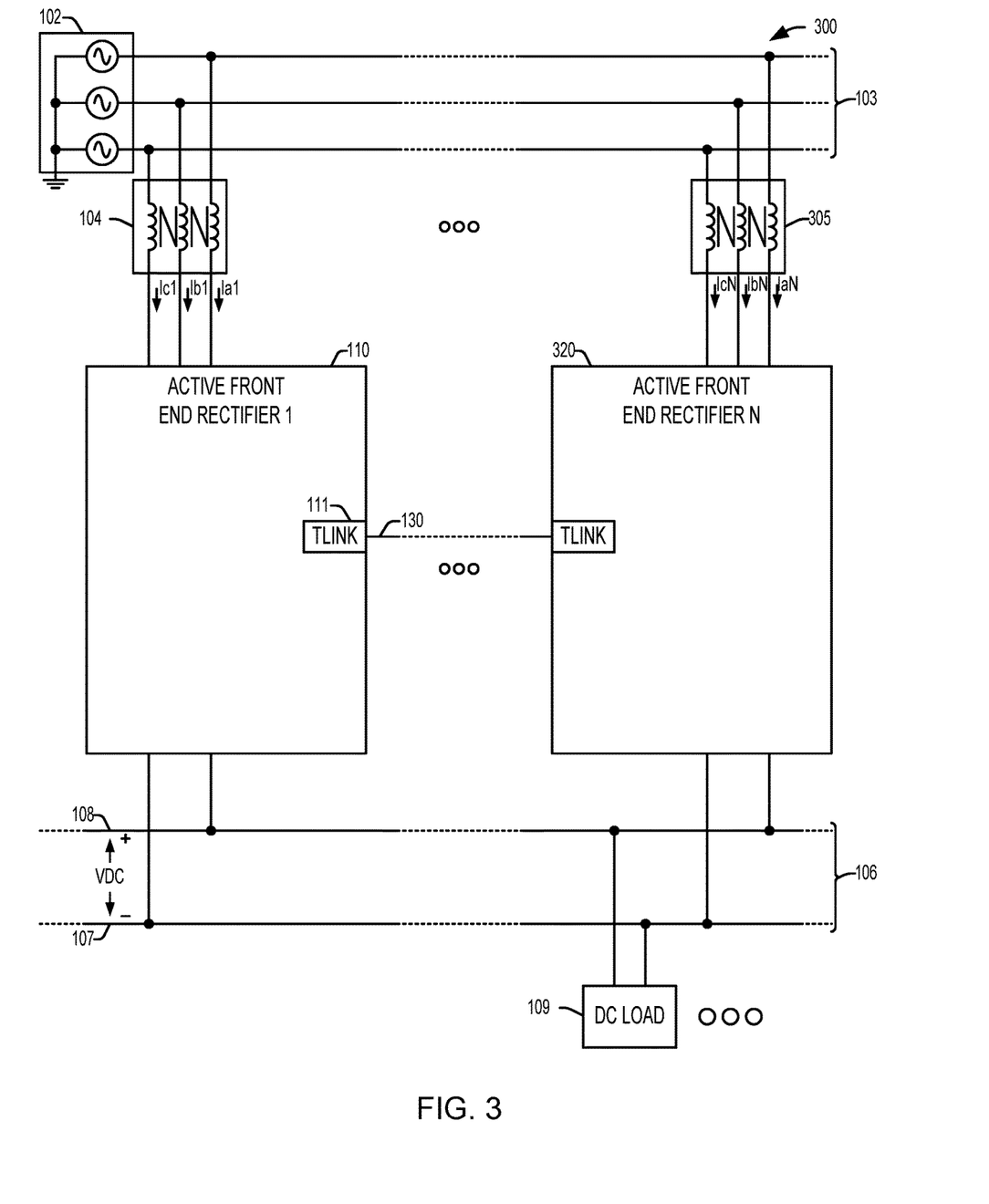
FIG. 3 is a schematic diagram of another transformerless system with N parallel active rectifiers.

FIG. 3 shows another example transformerless system 300 with N parallel active rectifiers and N associated, where N is an integer greater than 1. The system 300 includes a first active rectifier 110 and an Nth active rectifier 320 having respective multiphase common mode inductors 104 and 305 coupled to a shared multiphase AC input, as well as current sensors (not shown) to sense respective AC input phase currents Ia1, Ib1, Id1 and IaN, IbN, IcN of the rectifier AC inputs. The individual active rectifiers have features as described above with internal ground current regulators (e.g., 114 above). The N active rectifiers are synchronized (e.g., by a communications interface 130) to provide DPWM switching control signals synchronized to one another as discussed above to regulate their respective ground currents and operate to concurrently regulate the shared DC bus voltage VDC.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A power conversion system, comprising:
   a first multiphase common mode inductor directly connected to a multiphase AC input;
   a first active rectifier having a first rectifier AC input, a first rectifier DC output, a first switch circuit, and a first controller, the first rectifier AC input coupled to the first multiphase common mode inductor, the first rectifier DC output having first and second DC nodes, the first switch circuit configured to selectively couple nodes of the first rectifier AC input to the first and second DC nodes according to first discontinuous pulse width modulation (DPWM) switching control signals, the first controller configured to generate the first DPWM switching control signals to regulate a first ground current of the first active rectifier and to regulate a DC bus voltage across the first and second DC nodes;

a second multiphase common mode inductor directly connected to the multiphase AC input; and a second active rectifier having a second rectifier AC input, a second rectifier DC output, a second switch circuit, and a second controller, the second rectifier AC input coupled to the second multiphase common mode inductor, the second rectifier DC output coupled to the first rectifier DC output, the second switch circuit configured to selectively couple nodes of the second rectifier AC input to the first and second DC nodes according second DPWM rectifier switching control signals, the second controller configured to generate the second DPWM switching control signals to regulate a second ground current of the second active rectifier and to regulate the DC bus voltage.

2. The power conversion system of claim 1, further comprising:
a first multiphase LCL filter coupled between the first multiphase common mode inductor and the first switch circuit; and
a second multiphase LCL filter coupled between the second multiphase common mode inductor and the second switch circuit.

3. The power conversion system of claim 2, further comprising a communications connection between the first and second controllers; wherein the first and second controllers are configured to generate the respective first and second DPWM switching control signals synchronized to one another.

4. The power conversion system of claim 3, wherein:
the first controller is configured to limit a first modulation index to less than 1.15; and
the second controller is configured to limit a second modulation index to less than 1.15.

5. The power conversion system of claim 4, wherein:
the first controller includes a first ground current regulator, a first DC bus regulator, and a first DPWM signal generator configured to generate the first DPWM switching control signals based on a first ground current regulator output of the first ground current regulator and the first bus regulator modulation index of the first DC bus regulator to regulate the first ground current of the first active rectifier and to regulate the DC bus voltage; and
the second controller includes a second ground current regulator, a second DC bus regulator, and a second DPWM signal generator configured to generate the second DPWM switching control signals based on a second ground current regulator output of the second ground current regulator and the second bus regulator modulation index of the second DC bus regulator to regulate a second ground current of the second active rectifier and to regulate the DC bus voltage.

6. The power conversion system of claim 2, wherein:
the first controller includes a first ground current regulator, a first DC bus regulator, and a first DPWM signal generator configured to generate the first DPWM switching control signals based on a first ground current regulator output of the first ground current regulator and a first bus regulator modulation index of the first DC bus regulator to regulate the first ground current of the first active rectifier and to regulate the DC bus voltage; and the second controller includes a second ground current regulator, a second DC bus regulator, and a second DPWM signal generator configured to generate the second DPWM switching control signals based on a second ground current regulator output of the second ground current regulator and a second bus regulator modulation index of the second DC bus regulator to regulate a second ground current of the second active rectifier and to regulate the DC bus voltage.

7. The power conversion system of claim 1, wherein:
the first controller includes a first ground current regulator, a first DC bus regulator, and a first DPWM signal generator configured to generate the first DPWM switching control signals based on a first ground current regulator output of the first ground current regulator and a first bus regulator modulation index of the first DC bus regulator to regulate the first ground current of the first active rectifier and to regulate the DC bus voltage; and the second controller includes a second ground current regulator, a second DC bus regulator, and a second DPWM signal generator configured to generate the second DPWM switching control signals based on a second ground current regulator output of the second ground current regulator and a second bus regulator modulation index of the second DC bus regulator to regulate a second ground current of the second active rectifier and to regulate the DC bus voltage.

8. The power conversion system of claim 1, further comprising a communications connection between the first and second controllers; wherein the first and second controllers are configured to generate the respective first and second DPWM switching control signals synchronized to one another.

9. The power conversion system of claim 1, wherein:
the first controller is configured to limit a first modulation index to less than 1.15; and
the second controller is configured to limit a second modulation index to less than 1.15.

10. The power conversion system of claim 1, comprising N multiphase common mode inductors directly connected to the multiphase AC input, and N active rectifiers, each having a rectifier AC input, a rectifier DC output, a switch circuit, and a controller, N being an integer greater than 1, the rectifier AC input coupled to the multiphase common mode inductor, the rectifier DC output coupled to the first and second DC nodes, the switch circuit configured to selectively couple nodes of the rectifier AC input to the first and second DC nodes according to DPWM switching control signals, the controller configured to generate the DPWM switching control signals to regulate a ground current of the active rectifier and to regulate the DC bus voltage.

11. An apparatus, comprising:
a multiphase common mode inductor configured to be directly connected to a multiphase AC input; and
an active rectifier having a rectifier AC input, a rectifier DC output, a switch circuit, and a controller, the rectifier AC input coupled to the multiphase common mode inductor, the rectifier DC output having first and second DC nodes, the switch circuit configured to selectively couple nodes of the rectifier AC input to the first and second DC nodes according to discontinuous pulse width modulation (DPWM) switching control signals, the controller configured to generate the DPWM switching control signals to regulate a ground current of the active rectifier and to regulate a DC bus voltage across the first and second DC nodes.

12. The apparatus of claim 11, further comprising a multiphase LCL filter coupled between the multiphase common mode inductor and the switch circuit.

13. The apparatus of claim 12, wherein the controller is configured to limit a modulation index to less than 1.15.

14. The apparatus of claim 13, wherein the controller includes a ground current regulator, a DC bus regulator, and a DPWM signal generator configured to generate the DPWM switching control signals based on a ground current regulator output of the ground current regulator and the bus regulator modulation index of the DC bus regulator to regulate the ground current of the active rectifier and to regulate the DC bus voltage.

15. The apparatus of claim 11, wherein the controller is configured to generate the DPWM switching control signals synchronized to another rectifier.

16. The apparatus of claim 11, wherein the controller is configured to limit a modulation index to less than 1.15.

17. The apparatus of claim 11, wherein the controller includes a ground current regulator, a DC bus regulator, and a DPWM signal generator configured to generate the DPWM switching control signals based on a ground current regulator output of the ground current regulator and the bus regulator modulation index of the DC bus regulator to regulate the ground current of the active rectifier and to regulate the DC bus voltage.

18. A method, comprising:
sampling AC input phase currents of a rectifier AC input;
computing a ground current of an active rectifier based on the AC input phase currents;
computing a ground current regulator output based on the ground current to regulate the ground current;
computing a DC bus regulator modulation index to regulate a DC bus voltage;
computing an adjusted modulation index based on the DC bus regulator modulation index and the ground current regulator output to concurrently regulate the ground current and the DC bus voltage; and
generating discontinuous pulse width modulation (DPWM) switching control signals to operate a switch circuit of the active rectifier based on the adjusted modulation index.

19. The method of claim 18, further comprising:
limiting the adjusted modulation index to less than 1.15.

20. The method of claim 18, further comprising:
synchronizing the DPWM switching control signals to switching control signals of a second active rectifier.

* * * * *